United States Patent [19]

Pappas

[11] Patent Number: 4,653,827
[45] Date of Patent: Mar. 31, 1987

[54] CIRCUIT BREAKER APPARATUS

[76] Inventor: Phillip M. Pappas, 2318 Bluebonnet Blvd., Houston, Tex. 77030

[21] Appl. No.: 800,220

[22] Filed: Nov. 21, 1985

[51] Int. Cl.[4] ............................................. H01R 11/26
[52] U.S. Cl. ............................... 339/88 C; 339/176 T
[58] Field of Search .................... 339/88, 176 T, 153, 339/154, 263 R

[56] References Cited

U.S. PATENT DOCUMENTS 3,940,199 2/1976 Ecklund ........................... 339/176 T Primary Examiner—Joseph H. McGlynn

[57] ABSTRACT

Circuit breaker apparatus with two parallel formed terminals secured by metal screws to a dielectric body receiving a male thermocouple head threaded against the first metal screw with a tubular threaded male portion at the other end of body with tubular opening having a compression spring contacting the second metal screw and extending beyond the male portion providing electrical contact as the male end is threaded into a female thermocouple opening of a low voltage control with circuit break between the two parallel formed terminals providing for a second control function to be interposed within a low voltage thermocouple operated circuit.

3 Claims, 3 Drawing Figures

CIRCUIT BREAKER APPARATUS

This invention is a thermocouple circuit breaker that provides for a second control function to be inserted or interposed within a low voltage thermocouple operated circuit.

Contemporary gas operated apparatus such as deep fat fryers, heaters and stoves employ a low B.T.U. gas pilot that not only ignites the burner by demand of the thermostatic control action but also the constant burning pilot flame playing on a thermocouple probe with a welded junction of dissimilar metals produces a low voltage current measured in millivolts of electricity which low voltage is carried through the thermocouple to the gas thermomagnetic valve with the male head of the thermocouple threaded into a female threaded thermocouple opening where the millivolt current is carried to the thermomagnetic coil which holds the gas supply valve open against a light spring. A drop in the current produced of 60%, or so, will cause the spring to close the valve cutting off all the gas to the main operating burner and pilot as well, thus this self-operating control is known as a 100% safety control as it cuts off all gas in the event of pilot outage. In recent years various safety regulations have added requirements for high limit cut off controls such as is disclosed in my U.S. Pat. No. 4,532,490 for gas fryers, heaters, etc. and installation of these in a gas pilot generated low voltage circuit has presented problems. The Thermocouple suppliers have inserted within the thermocouple line a junction box with two or more soldered connections with the thermocouple extending from each side or end of the box. These soldered joints are extremely fragile and any bending or twisting or jolting of the thermocouple extending from soldered joints at the sides or within the junction box breaks the millivolt circuit and cuts off the entire unit.

In my disclosure there are no soldered joints and no need of bisecting the thermocouple into two separate parts as the standard single control thermocouple is used as the male end of same is simply unscrewed from the female thermocouple opening on the gas thermomagnetic valve and the male threaded extension with extending current carrying compression spring of the dielectric body of my breaker is threaded into the thermomagnetic valve compressing the current carrying spring between the base of terminal attaching screw and the base of the thermocouple connection of the thermomagnetic valve. The exposed female threaded portion of my breaker can then accept the standard thermocouple with threaded male head against the base of the screw holding the formed terminal around the breaker body. With wires extending from the spade terminals or optional screw terminals a limit control or other function switch can easily be interposed in the thermocouple operated low voltage circuit.

With my Breaker it will be readily seen that there are no soldered connections to break or come loose and that a current carrying spring provides a positive final contact connection to the thermomagnetic valve and a standard continuous type thermocouple is utilized without any break or interruption in the continuity of the millivolt producing and carrying thermocouple thus providing long trouble free operation unaffected by jarring or vibrations of the thermocouple.

All of the aforementioned facts and objects of the invention as well as details of a typical and illustrated embodiment will be understood fully from the following description of the accompanying drawings.

Figure 1:
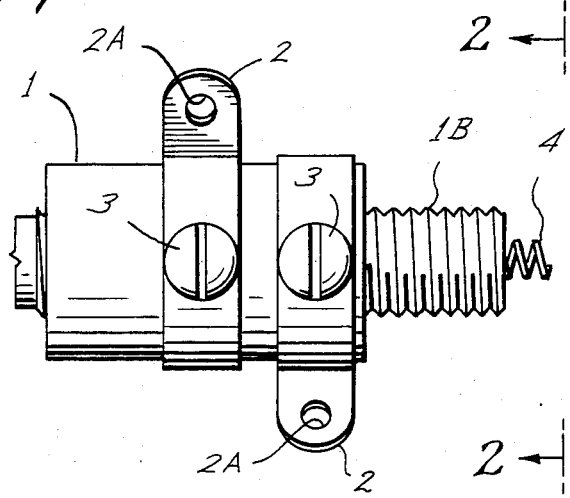
FIG. 1 is a top view of the thermocouple breaker.

Referring to the drawings in detail:

FIG. 1 is a top view of the Thermocouple Breaker with Body 1 of plastic or dielectric material with extending male threaded portion 1B with formed parallel metal contact members 2 secured by metal screws 3 threaded into plastic Body 1. Formed contact members 2 are provided with outward extending portions to accommodate standard type spade terminals with optional holes shown in dotted openings 2A in the outward extending portions of the contact meabers.

Figure 2:
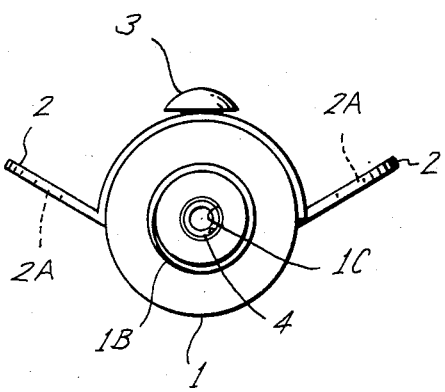
FIG. 2 is an end view of the Thermocouple Breaker taken on Line A—A looking in the direction of the arrows.

FIG. 2 shows the formed Terminals 2 with outward extending portions of spade terminal attachment and optional holes 2A for screw terminal attachment. It will be noted that Terminals 2 are securely held by Screws 3 and their formed portion tightly following the periphery of Breaker Body 1 insures secure parallel alignment of terminals in a fixed position. Compression current carrying spring 4 preferably of berrylium copper for good electrical conductivity extends out the opening 1C of male threaded end portion 1B of Breaker Body 1.

Figure 3:
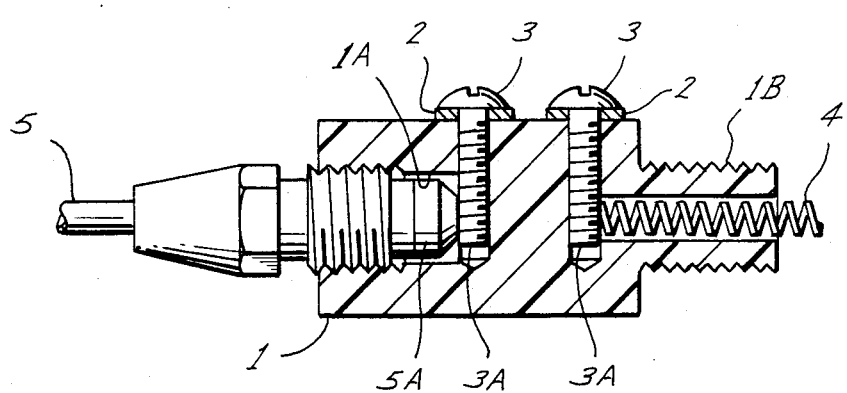
FIG. 3 is a side elevation of the Thermocouple Breaker partly cut away at each end showing the contact securing screws.

FIG. 3 shows the standard Thermocouple 5 with threaded male head screwed against the periphery screw threads 3A of terminal securing screw 3 for electrical continuity to the outward extending terminal 2 which with a spade terminal attached and extending wire carries a circuit to an interposed control such as a high limit control as shown in my U.S. Pat. No. 4,532,490 with the circuit return from same extending back by wire connection and spade terminal attached to the adjacent parallel contact 2 with circuit extending to screw 3 preferably of current carrying brass with base portion 3A bearing against berrylium copper spring 4 to complete the circuit to the outward extending portion of spring 4 so that the threading of the male portion 1B of Breaker 1 into a thermopilot valve will complete a circuit with a second control function interposed ahead of the thermopilot valve. It will be seen that the compression current carrying spring insures electrical continuity to the base of the female threaded opening of the thermopilot valve even if the extending male portion 1B of Body 1 is not threaded all the way into the thermomagnetic valve While I have described the preferred embodiments of my invention and illustrated same in the accompanying drawings, certain minor changes or alterations may appear to one skilled in the art to which this invention relates during the extensive manufacture of same and I therefore reserve the right to make such alterations or changes as shall fall within the scope of the appended claims.

I claim:

1. Circuit Breaker Apparatus with two parallel half-round formed metal terminals secured by two metal screws to a preferably round dielectric body having one end with female threaded internal opening extending to the base of the first metal screw with male threaded external portion extending from the other end of the dielectric body with opening within the male threaded portion with opening extending to the base of the second metal screw with current carrying compression coil spring within said opening extending from the periphery of the base of the second metal screw beyond the extending male threaded portion to provide positive electrical continuity as the male threaded portion is screwed into a thermomagnetic operated gas valve, with current interruption between the two parallel metal terminals for wire attachment to and from a switch operated limit control.

2. Circuit Breaker Apparatus with a round dielectric body having a female threaded opening at one end, a male threaded tubular extension at the other end with two parallel half-round formed metal terminals secured by two metal screws threaded perpendicularly into the dielectric body with a male thermocouple head contacting the base of the first metal screw with a current carrying metal compression spring within the male threaded tubular extension extending from the base of the second terminal screw beyond the end of said tubular extension providing contact as the male end is threaded into a female thermocouple opening of a low voltage control with circuit break between the two parallel terminals providing for a second control function with an associated switch means to be interposed within a low voltage thermocouple operated circuit.

3. Circuit Breaker Apparatus with a rectangular dielectric body having a female internal threaded opening at one end, an external male threaded tubular extension at the opposite end with two parallel half rectangular formed metal terminals secured by two metal screws threaded perpendicularly into the dielectric body with a male thermocouple head contacting the base of the first metal screw with a current carrying metal compression spring within the male threaded tubular extension with said spring extending from the base of the second terminal screw beyond the end of said tubular extension providing contact as the male end is threaded into a female thermocouple opening of a low voltage control with circuit break between the two parallel terminals providing a second control function with an associated switch means to be interposed within a low voltage thermocouple operated circuit.

* * * * *